United States Patent Office 3,799,884
Patented Mar. 26, 1974

3,799,884
PREPARATIONS OF SULFUR SUSPENSIONS
Donald C. Young, Fullerton, Calif., assignor to Union Oil Company of California, Los Angeles, Calif.
No Drawing. Filed June 29, 1972, Ser. No. 267,555
Int. Cl. B01j 13/00
U.S. Cl. 252—313 R     8 Claims

ABSTRACT OF THE DISCLOSURE

Aqueous suspensions of finely subdivided sulfur having particle size ranges suitable for use as soil sulfur and/or as pesticidal sulfur are described. The invention comprises a method for the preparation of these suspensions of sulfur wherein porous particulate sulfur is suspended in an aqueous medium and is subjected to high shear and turbulence by pumping the resulting suspension through a closed circulation system for a period of time from 5 to about 200 minutes, sufficient to comminute the particulate sulfur to a finely subdivided state and form a stable suspension of the finely subdivided sulfur. In its preferred embodiment, the sulfur is distributed and handled as porous particulate sulfur and, at the application site, the particulate sulfur is added to an aqueous medium contained in the vessel of a conventional spray applicator and is circulated through the pump of the applicator and returned to the vessel for the requisite period of time to comminute the sulfur to the finely subdivided state. When the sulfur is sufficiently subdivided, the pump discharge is diverted to the spray nozzles of the applicator and the sulfur is applied to the soil or to the plants in an otherwise conventional procedure.

DESCRIPTION OF THE INVENTION

This invention relates to suspensions of finely subdivided sulfur and to a method for the manufacture of such suspensions.

Sulfur is commonly used in agricultural purposes by application to the soil to correct excess alkalinity and to supply sulfate for the plants. The sulfur is commonly applied to the soil as an aqueous suspension of finely subdivided sulfur wherein at least 50 weight percent of the particles pass a 200 mesh screen. Another application is the use of finely subdivided sulfur for pesticidal purposes wherein the sulfur is applied as a dust or as a wettable powder to plants. The sulfur used for this purpose is somewhat more subdivided, approximately 90 weight percent of the sulfur passing a 325 mesh screen.

Sulfur is commonly produced by recovering it from hydrogen sulfide in hydrocarbon-containing gases (sour gas sulfur) or is obtained by mining of sulfur deposits (Frasch sulfur). By either procedure, the sulfur is generally obtained in a molten condition and is commonly discharged into storage areas where it solidifies into large slabs which are broken into chunks and, thereafter, ground into the finely subdivided powder required for soil or pesticidal applications. The grinding of the sulfur is a tedious procedure wherein the sulfur is ground in a dry state under an inert gas to avoid the hazards of explosions of sulfur dust. A number of problems are encountered in the handling, storage and use of the resulting sulfur powder. Oftentimes, the sulfur readily cakes and forms large chunks. The handling is also inconvenienced by the large amounts of dust which are formed and which present health and explosion hazards. Accordingly, a more facile manner in handling and storage of sulfur and in the preparation of the finely subdivided sulfur particles is desirable.

In my prior patent, No. 3,637,351, and in copending division applications thereof, Ser. Nos. 178,940 and 178,941, both filed on Sept. 9, 1971, there is disclosed and claimed a novel, porous, particulate sulfur and means and method for its preparation. This porous particulate sulfur is formed by intimately admixing molten sulfur and water into spray droplets which solidify into discrete particles having an irregular shape and porous structure. The solidification of sulfur into these porous particles represents an advance over the prior techniques of permitting molten sulfur to solidify in a quiescent pool since the subsequent pulverization of the slab of sulfur is obviated. In addition, it has been found that the porous particulate sulfur prepared as described in said prior applications can be readily stored and handled without any significant amount of dust formation and, particularly, it has been found that the particulate sulfur can be readily handled as an aqueous suspension.

I have now found that the aforementioned porous particulate sulfur can be readily ground into a suspension of finely subdivided sulfur having a size range suitable for a direct application to soil or suitable for the application to plants as pesticidal sulfur. Conveniently, this grinding can be performed using the very apparatus which is commonly used for the application of the subdivided sulfur to the soil or to plants. This is performed by adding the sulfur particles to an aqueous medium contained within the applicator storage vessel and pumping the resulting suspension in a closed circulation system through the pump of the applicator and back to the storage vessel. This pumping is conducted for a moderate length of time, e.g., from about 5 to about 20 minutes and provides sufficient shear and turbulant forces to comminute the sulfur particles to the desired, finely subdivided state.

The sulfur can be stored as the porous particulate sulfur and can be handled in either a dry state or as a suspension in water. Accordingly, problems such as dusting and caking which are associated with handling of powdered sulfur are obviated. Since the sulfur is comminuted in an aqueous medium, dust is not formed and the necessity to blanket the grinding facilities with an inert gas is obviated. Finally, since in its preferred form, the invention utilizes the conventional equipment used for the application of sulfur to the soil or to plants, special grinding facilities are not required.

The grinding of the sulfur in the aqueous medium in accordance with this invention is preferably performed in the presence of a hydrogen sulfide acceptor which is added to the aqueous medium before or during the grinding operation to absorb any hydrogen sulfide that may be liberated from the particles and thereby eliminate corrosion and odor problems associated with this gas. A very suitable acceptor is an ammonium phosphate which, in addition, reduces the frictional flow resistance of the resulting sulfur powder. In addition, it is preferred to incorporate a minor amount of a surfactant in the aqueous medium during, before, or after the comminution of the sulfur to stabilize the resulting suspension and reduce the frictional flow resistance of the suspension.

The porous particulate sulfur which is ground in accordance with this invention comprises sulfur which is formed by admixing the sulfur with water under conditions whereby a homogeneous dispersion of sulfur in water droplets is formed. Contacting of the molten sulfur with the water is performed with relative amounts of water to the sulfur of from 0.2:1 to about 20:1 volumes, preferably from 0.6:1 to 10:1, most preferably from 0.7:1 to 5:1, sufficient to solidify the sulfur. The water separates from the porous particles and is drained therefrom to produce a highly porous particulate sulfur. These sulfur particles have a pore volume of about 0.04 to 0.20, more generally about 0.05 to 0.15, and 0.05 to 0.13 cubic centimeters per gram.

The sulfur particles possess high specific surface areas, e.g., areas from 60 to 90 square centimeters per gram are common. The specific surface area as used herein refers to the area within the pores of the particles. The particles having an irregular spherical structure with numerous channels and thus the total surface area for contact in chemical processes and/or soil utilization is higher than those given herein. The surface area is calculated from the pore volume determination assuming conservatively that the pores are a cylinder having a 26.5 micron diameter, using the formula:

$$\bar{r} = Vg/Sg$$

wherein:

$\bar{r}$ is the average pore diameter in angstrom units;
$Vg$ is the pore volume in cubic centimeters per gram;
$Sg$ is the surface area in square meters per gram;

as set forth by Wheeler on page 253 of the publication "Advances In Catalysis," volume III (1951), Academic Press, Inc., beginning on page 249.

The sulfur particles have a relatively low bulk density generally about 0.97–1.11, and have a maximum angle repose of about 30°–40° and are thus capable of being stored in piles with steeply angled sides which, of course, is advantageous for storage and transportation purposes. The sulfur particles, using conventional X-ray diffraction data, were found to be essentially pure rhombic sulfur and contained no detectable amounts of the monoclinic and amorphous forms. The rhombic sulfur particles were found to have two distinct forms in that about 50 weight percent of the sulfur melted at a distinct and lower melting point (115°–117° C.) generally subscribed to an equilibrium mixture of both sulfur-phi and sulfur-lambda forms with the balance melting at a higher and distinct melting point (121°–123° C.) subscribed to pure sulfur-phi. Hence, 35–65 weight percent, more generally 40–60 weight percent of the sulfur, is pure sulfur-lambda with the balance being a mixture of sulfur-phi and sulfur-lambda.

The porous sulfur particles have excellent "grindability," i.e., are easily ground into smaller diameter particles having higher surface areas. Grindability is generally defined as the additional surface obtained by grinding a particle with a measured amount of energy over a measured amount of time. For purposes herein, grindability is defined as the percent of particles passing a 10 mesh U.S. Standard Sieve Screen by placing, for about 2 minutes, about 100 grams of sulfur particles passing a 4 mesh screen, but retained on a 6 mesh screen (i.e., a 5 mesh particle) into a standard Waring Blender having a one quart volume container and having an unloaded blade speed of about 1,850 r.p.m. In general, the sulfur particles produced by my invention have the following range of properties as set forth in Table 1 below:

TABLE 1

| | Broad | Intermediate | Narrow |
|---|---|---|---|
| Bulk density of mixture (grams/milliliter) | 0.90–1.3 | 0.97–1.11 | 0.05–1.09 |
| Average diameter of particles (inches) | 0.02–0.11 | 0.06–0.10 | 0.08–0.095 |
| Bulk density of −8+14 mesh fraction (grams/milliliter) | 0.9–1.3 | 0.95–1.11 | 0.98–1.02 |
| Percent fines (weight percent −100 mesh) | 0–3 | 0–2 | 0–0.8 |
| Percent intermediate (wt. percent −4+20 mesh) | 50–90 | 60–90 | 70–80 |
| Percent coarse (weight percent +4 mesh) | 0–30 | 0–18 | 0–8 |
| Maximum angle of repose (degrees) | 30–40 | 35–39 | 36–38.5 |
| Pore volume (cubic centimeters/gram) | 0.04–0.20 | 0.05–0.15 | 0.05–0.13 |
| Specific surface area (square centimeters/gram) | 30–100 | 50–80 | 55–70 |
| Pore volume of −8+14 mesh fraction (cubic cent./gram) | 0.04–0.20 | 0.05–0.15 | 0.05–0.13 |
| Weight percent sulfur-lambda | 36–65 | 40–60 | 48–52 |
| Grindability (wt. percent reduced from −4+6 mesh to −100 mesh) | 60–200 | 70–100 | 75–100 |

Since the bulk density of the sulfur particles is not significantly greater than the density of water, the porous particulate sulfur readily forms aqueous suspensions by the simple addition of the sulfur particles to water. The sulfur can be admixed with water in amounts comprising from 5 to about 95 volume percent, preferably from 10 to 50 volume percent and can be suspended in the water with only a minor degree of agitation. The resulting suspension can then be stored and handled as a suspension or slurry of sulfur particles in water. When, however, the sulfur is subjected to conditions of high shear and turbulence, the sulfur particles are comminuted and the degree of subdivision of the particles depends on the time and degree of turbulence to which they are subjected.

I have found that the sulfur particles can be readily reduced to a subdivided state wherein no greater than about 5 weight percent of the sulfur is in the form of particles having diameters greater than about 0.033 inch, i.e., retained on a 20 mesh screen. This degree of comminution can be continued until a weight majority of the sulfur is in the form of particles passing a 200 mesh screen or passing a 325 mesh screen.

The pumping of the suspension of sulfur can be performed using conventional pumping means, preferably a centrifugal or gear pump. Centrifugal pumps that can be used can have impellers that are either open or shrouded, although the open or semi-open type impellers are preferred. The impellers can be of single suction or double suction type, i.e., the liquid can enter from one side or from both sides of the casing. The casings can be circular or can be in the form of a volute, increasing in cross-sectional area as the outlet is approached. The casing can also have guide vanes or diffusers between the impellers and the casing chamber to minimize losses in the pump.

Another type of pump which can be used comprises a rotary gear-type pump. In this pump, two or more impellers are mounted in a rotary pump casing. The impellers have the form of gear wheels or of lobed cams and rotate with a small clearance between their engaging teeth or lobes and the interior surface of the casings. Because of the close tolerances in the moving parts of these pumps, these gear pumps are preferred and are somewhat more efficient in the comminution of the sulfur particles. The use of these pumps substantially minimizes the amount of circulation which is required to achieve a desired degree of subdivision of the sulfur.

The comminution of the sulfur is preferably performed in the presence of various hydrogen sulfide acceptors since sulfur particles prepared from molten sour gas sulfur commonly contain a slight amount of dissolved quantities of hydrogen sulfide. The grinding of such sour gas sulfur in an aqueous medium will otherwise result in an increase in acidity of the medium, causing corrosion problems as well as release of noxious fumes of hydrogen sulfide. Various hydrogen sulfide acceptors can be used; these are generally basic materials which will react with the hydrogen sulfide. Examples of such materials include ammonia, calcium hydroxide, of various alkali metal hydroxides, ammonium and alkali metal salts of polyvalent anions such as orthophosphate, pyrophosphate, borates, citrates, tartarates, sulfates, carbonates, etc. In general, any ammonium or alkali metal salt of a water soluble polyvalent anion can be used. These salts are commonly used for buffering of the pH of aqueous solutions. The salts should have water solubility and should be present in a sufficient quantity to react with the hydrogen sulfide and form an acid salt of the anion and ammonium or alkali metal sulfide. Generally, the hydrogen sulfide acceptor can be employed in amounts sufficient to adjust and maintain the pH at a near neutral value, e.g., from 6 to about 10, preferably from 6.5 to about 8.5. The acceptor can be added in its entirety at the outset of the grinding operation or, if desired, can be added in increments during the grinding.

It is also preferred to incorporate from about 0.0 to about 0.5, preferably from 0.05 to about 0.1 weight percent of a water soluble phosphate in the aqueous medium. The phosphate functions to reduce the frictional flow resistance to the suspension of sulfur. It is believed that the phosphate functions in this regard by deflocculating large agglomerates of sulfur particles. Preferably, the phosphate is incorporated in the aqueous suspension as an ammonium or alkali metal salt and thereby also serves as the aforementioned buffer or hydrogen sulfide acceptor. Various phosphates can be used including orthophosphate or the water soluble acyclic polyphosphates, e.g., pyrophosphates, tripolyphosphates, tetrapolyphosphate, pentapolyphosphate, etc. A very suitable additive comprises an aqueous solution of the ammonium salts of a highly concentrated phosphoric acid which comprises a mixture of orthophosphoric and acyclic polyphosphoric acid, the latter being present in an amount from 5 to about 80 percent of the total phosphorus present. These ammonium phosphate salts have a pH from about 5.5 to about 10, preferably from about 6.5 to 8.5. At these pH values, the polyphosphate anions are relatively resistant to hydrolysis and can be diluted to low concentrations. The solutions contain from 5 to about 15 weight percent nitrogen and from 12 to about 30 weight percent phosphorus, calculated as $P_2O_5$. Typical compositions of these materials include compositions having designations such as "8–24–0," "10–34–0," "12–36–0," etc., wherein the first number indicates the weight percent ammonia present, calculated as nitrogen, and the second number indicates the weight percent phosphorus present, calculated as $P_2O_5$.

An additional material which can be incorporated in the aqueous medium and which functions to significantly reduce the frictional flow resistance to the suspension of sulfur comprises any oil-in-water surfactant. The surfactant can be present in an amount from about 0.01 to about 1.0, preferably from 0.05 to about 0.5 weight percent. The surfactant not only serves to significantly reduce the frictional flow resistance to the suspension, but it also significantly stabilizes the suspension against separation into a solid and aqueous phase.

Suitable surfactants include anionic, cationic and nonionic types. Anionic surfactants include alkyl aryl sulfonates such as dodecylbenzene sulfonate, sulfated alcohols and salts thereof such as oleyl and lauryl alcohol sulfates, sodium tetradecyl, heptadecyl and 2-ethylhexyl sulfates, esters of sodium sulfosuccinic acid such as sodium dialkyl sulfosuccinate, sodium salt of sulfated monoglycerides such as the sodium salt of the sulfated glyceride of coconut oil, fatty acids, etc.

Cationic agents include quaternary ammonium salts and salts of higher alkylamines such as octadecyl, methylbenzyl, ammonium chloride and lauryl pyridinium chloride.

Nonionic agents include ethers and esters formed by the reaction of ethylene oxide with a variety of compounds such as fatty alcohols, alkylphenols, glycol ethers, fatty acids, rosin soaps, tall oil, fatty acid esters of sorbitol, fatty amides and fatty amines, e.g., the reaction product of monophenol and from about 4 to 12 mols of ethylene oxide. Other nonionic agents are the fatty acid esters of polyhydroxy alcohols such as glycerol and sorbitol. Examples are glycerol monooleate, sorbitol mono- or trioleate, mono- or tri-stearate and mono-laurate or mono-palmitate.

The following examples will serve to illustrate a mode of practice of the invention and demonstrate the results obtained thereby:

EXAMPLE 1

The grinding of porous particles of sulfur was performed in laboratory equipment comprising a storage tank approximately 8 inches in diameter and 12 inches in height, equipped with a bottom drawoff to which was fitted a ¾-inch line, 26 inches in length. This line discharged into the suction of an open impeller, centrifugal pump which discharged into a ¾-inch diameter rubber hose approximately 2 feet long that discharged into the top of the storage tank. The pump was driven by a ⅓ horsepower electrical motor and the contents of the storage vessel were stirred by a propeller mixer.

The tank was charged with 5000 grams water and 5000 grams of porous particulate sulfur having the size distribution which is set forth in the following table. The sulfur was slowly added to the water in the tank while the water was being circulated through the system. Samples of the suspension of sulfur in water were taken after 5, 10, 20, 40 and 80 minutes of circulation. These samples were filtered, oven dried, and the resulting solids were analyzed by screen analysis for size distribution. The following results were obtained:

TABLE 2

| Screen No. | Porus particles, percent | Weight percent retained on screens after circulating for— | | | | |
|---|---|---|---|---|---|---|
| | | 5 min. | 10 min. | 20 min. | 40 min. | 80 min. |
| 4 | 1.02 | 0 | 0 | 0 | 0 | 0 |
| 8 | 10.61 | 0.4 | 0.33 | 0 | 0 | 0 |
| 10 | 11.79 | 2.56 | 1.46 | 0.64 | 0.29 | 0 |
| 12 | 7.04 | 2.48 | 1.69 | 0.92 | 0.43 | 0 |
| 20 | 38.94 | 12.74 | 10.24 | 6.22 | 1.78 | 0 |
| 50 | 17.62 | 35.53 | 35.33 | 34.53 | 34.02 | 26.53 |
| 70 | 3.31 | 6.51 | 7.30 | 7.72 | 8.92 | 8.41 |
| 100 | 3.62 | 6.48 | 7.30 | 6.95 | 4.67 | 8.23 |
| 170 | 4.34 | 25.38 | 31.59 | 13.17 | 11.04 | 19.78 |
| 200 | 0.64 | 3.48 | 2.30 | 8.06 | 15.92 | 19.86 |
| Thru 200 | 1.07 | 2.08 | 1.48 | 21.45 | 21.08 | 16.69 |

The fractions passing a 200 mesh screen were further analyzed by Coulter counter method to determine their size distribution and to determine the diameter at the 50 weight percent size. These diameters were as follows:

TABLE 3

| | Grinding time (minutes) | | | | | |
|---|---|---|---|---|---|---|
| | 0 | 5 | 10 | 20 | 40 | 80 |
| Diameter, microns | 23.35 | 23.74 | 21.86 | 28.01 | 22.90 | 20.87 |

The surface areas of the fractions of the sulfur powder were calculated assuming the particles to be approximately spherical. The surface area of each sample was then determined by summation of the surface areas of the sieve fractions. The following surface areas as a function of grinding time were thus determined:

TABLE 4

| | Grinding time (minutes) | | | | | |
|---|---|---|---|---|---|---|
| | 0 | 5 | 10 | 20 | 40 | 80 |
| Surface area, square centimeters/gram | 6,832 | 19,203 | 20,443 | 37,012 | 43,865 | 44,425 |

During the experiment, no difficulty was experienced in maintaining the sulfur suspended in the water. The screen analysis of the samples removed during the experiment reveal that the porous particulate sulfur very readily is comminuted by the wet grinding procedure to provide a high content of finely subdivided particles.

EXAMPLE 2

The experiment is repeated using 1750 grams distilled water and 1750 grams of slab sulfur which had been pulverized to a size range approximating the size range of the porous particulate sulfur used in the preceding experiment. This sulfur had been obtained by the cooling of a pool of molten sulfur, breaking up the resulting slab of sulfur and pulverizing the sulfur to approximate the size range of the porous particulate sulfur. The following table summarizes the screen analysis of samples of the suspensions of sulfur which were obtained at 5, 10, 20, 40 and 80 minutes of circulation:

TABLE 5

| Screen No. | Porus particles, percent | Weight percent retained on screens after circulating for— | | | | |
|---|---|---|---|---|---|---|
| | | 5 min. | 10 min. | 20 min. | 40 min. | 80 min |
| 4 | 3.93 | 0 | 0 | 0 | 0 | 0 |
| 8 | 43.14 | 9.62 | 5.20 | 0.22 | 0 | 0 |
| 10 | 11.33 | 7.06 | 9.01 | 3.67 | .060 | 0 |
| 12 | 2.85 | 1.91 | 2.76 | 1.78 | 1.19 | 0 |
| 20 | 16.05 | 7.77 | 6.26 | 3.45 | 2.29 | 0.08 |
| 50 | 12.64 | 22.17 | 20.89 | 18.80 | 16.70 | 12.15 |
| 70 | 1.65 | 4.99 | 5.20 | 5.34 | 13.02 | 47.14 |
| 100 | 3.87 | 9.99 | 10.82 | 15.35 | 12.13 | 5.42 |
| 170 | 3.07 | 28.26 | 38.39 | 42.49 | 49.70 | 27.40 |
| 200 | 0.46 | 1.34 | 1.17 | 2.89 | 4.08 | 1.93 |
| Thru 200 | 1.02 | 6.94 | 0.32 | 6.01 | 0.30 | 5.88 |

The particle diameters at the 50 weight percent increments of the fractions passing a 200 mesh screen were as follows:

TABLE 6

| | Grinding time (minutes) | | | | | |
|---|---|---|---|---|---|---|
| | 0 | 5 | 10 | 20 | 40 | 80 |
| Diameter, microns | 24.50 | 26.18 | 24.92 | 26.83 | 21.52 | 23.95 |

The surface areas of the fractions of the sulfur powder were calculated from the diameters of the particles and are as follows:

TABLE 7

| | Grinding time (minutes) | | | | | |
|---|---|---|---|---|---|---|
| | 0 | 5 | 10 | 20 | 40 | 80 |
| Surface area, square centimeters/gram | 5,993 | 24,099 | 19,850 | 28,720 | 34,132 | 26,630 |

Difficulty was observed in maintaining the suspension of the sulfur in the water, particularly when the sulfur was initially added to the water. Difficulty was also observed in starting and maintaining the flow throughout the experiment.

The difficulty in maintaining suspension of the sulfur in the water was reflected in the variation of the analytical results where a considerably greater variation was observed in the relationship of particle size and grinding time. Generally, however, a comparison of surface areas obtained from the slab sulfur in this example to that obtained by practicing the invention in Example 1 reveals that a significantly greater subdivision was achieved by the practice of the invention throughout the grinding periods.

EXAMPLE 3

A large quantity of porous particulate sulfur was comminuted in a commercial liquid fertilizer plant. The equipment employed comprised a 10-foot diameter vessel approximately 10 feet in height that was equipped with a 6-inch diameter bottom drawoff to the suction of a centrifugal pump discharged by a 25 horsepower electrical motor. The pump discharged into a 4-inch diameter line and the flow was diverted to the top of the storage tank for complete recycling of the tank contents. A propeller mixer driven by a 5 horsepower electrical motor was placed in the vessel to agitate the contents thereof during circulation. The vessel was charged with 780.3 gallons of water and thereafter 6,000 pounds of sulfur were slowly added to the suspension while agitating the vessel contents and circulating the water through the centrifugal pump. The sulfur was completely added within a period of 19 minutes and thereafter the pump was operated on total recycle of liquid contents to the vessel for a period of 110 minutes. After 80 minutes, one quart of Triton X100 was added to the suspension. Upon completion of a 5, 10, 20, 40, 80, 100 and 110 minute recycle period, samples of the suspension of sulfur were removed, filtered and dried, and the sulfur particles were subjected to screen analysis to reveal the following distribution of sulfur particles:

TABLE 8

| Screen No. | Unground | Weight percent retained on screens after circulating for— | | | | | | |
|---|---|---|---|---|---|---|---|---|
| | | 5 min. | 10 min. | 20 min. | 40 min. | 80 min. | 100 min. | 110 min. |
| 4 | 6.99 | 1.05 | .51 | .42 | 0 | 0 | 0 | 0 |
| 8 | 24.23 | 13.44 | 9.74 | 5.60 | 4.74 | 3.38 | 2.24 | 1.70 |
| 10 | 16.71 | 13.93 | 11.57 | 9.21 | 8.62 | 9.14 | 6.79 | 5.06 |
| 12 | 6.40 | 7.73 | 5.12 | 6.67 | 5.70 | 6.53 | 3.08 | 3.94 |
| 20 | 20.65 | 30.30 | 33.28 | 32.33 | 36.17 | 36.87 | 33.43 | 37.91 |
| 50 | 11.63 | 13.51 | 17.10 | 16.57 | 20.05 | 23.98 | 25.17 | 27.54 |
| 70 | 4.0 | 3.08 | 3.04 | 3.60 | 3.44 | 2.51 | 5.01 | 3.91 |
| 100 | 3.34 | 3.19 | 3.69 | 4.15 | 3.75 | 2.97 | 4.28 | 3.41 |
| 170 | 4.39 | 5.26 | 6.74 | 8.57 | 5.84 | 6.42 | 7.55 | 5.29 |
| 200 | .84 | 4.28 | 5.84 | .64 | .80 | 3.54 | .25 | .13 |
| Thru 200 | .84 | 4.23 | 3.34 | 12.05 | 10.88 | 4.66 | 12.19 | 11.09 |

The preceding data evidence that the porous sulfur particles can be readily comminuted to a fine state of subdivision by circulating an aqueous suspension of the sulfur in commercial type equipment.

The invention has been described with particular reference to the illustrated and preferred mode of practice. It is not intended that this illustration be unduly restrictive of the invention. Instead, it is intended that the invention be defined by the reagents and steps, and their obvious equivalents, set forth in the following claims.

I claim:

1. A method for the preparation of sulfur in finely divided form which comprises: adding porous particles of sulfur having an average particle diameter of from 0.02 to 0.4 inch and no greater than about 10 weight percent having a particle diameter less than 0.004 inch, a bulk density from 0.9 to 1.3 grams per cubic centimeter and a pore volume from 0.04 to 0.15 cubic centimeter per gram to water to prepare an aqueous suspension containing from 5 to about 95 weight percent of said particles of sulfur, subjecting the resultant suspension to shearing forces under turbulent flow conditions by pumping said suspension through a closed circulation system for a period of from 5 to about 200 minutes, sufficient to comminute said particles to a subdivision wherein less than about 5 weight percent has a particle diameter greater than 0.033 inch.

2. The method of claim 1 wherein said porous particles of sulfur and water are added to the storage vessel of a spray rig having spray discharge means to direct a pressured spray or finely divided sulfur onto the ground or plants and centrifugal pumping means to pressure said suspension of finely divided sulfur and force it through said spray means and wherein said suspension of sulfur in finely divided form is prepared by circulating it between said pumping means and storage vessel using said pumping means to effect such circulation until said sulfur is comminuted to said subdivision.

3. The method of claim 2 including the step of spraying said susepnsion of finely divided sulfur which comprises diverting all or a portion of the discharge of said pumping means to said spray discharge means after said sulfur particles have been comminuted to said finely divided form.

4. The method of claim 1 wherein a hydrogen sulfide acceptor is added to said aqueous medium in an amount sufficient to maintain the pH of said suspension above about 6.

5. The method of claim 4 wherein said hydrogen sulfide acceptor is an ammonium phosphate.

6. The method of claim 5 wherein said hydrogen sulfide acceptor is diammonium orthophosphate.

7. The method of claim 5 wherein said hydrogen sulfide acceptor is a solution of ammonium orthophosphates and acyclic polyphosphates having from 5 to about 15 weight percent nitrogen and from 12 to 30 weight percent phosphorus, calculated as $P_2O_5$.

8. The method of claim 1 wherein a surfactant is added to said aqueous medium in an amount from 0.01 to 0.5 weight percent.

References Cited
UNITED STATES PATENTS

| | | | |
|---|---|---|---|
| 2,658,016 | 11/1953 | Brown et al. | 252—313 R X |
| 3,637,351 | 1/1972 | Young et al. | 423—567 |
| 1,969,242 | 8/1934 | Szegvari | 252—313 R |
| 2,190,922 | 2/1940 | Heath et al. | 252—317 |
| 2,332,934 | 10/1943 | Rollo et al. | 252—313 R X |
| 2,765,255 | 10/1956 | Swarbrick | 424—164 X |

RICHARD D. LOVERING, Primary Examiner

U.S. Cl. X.R.

71—4, 64 C; 252—314; 424—162, 164